(12) United States Patent
Hintermann et al.

(10) Patent No.: US 12,535,697 B1
(45) Date of Patent: Jan. 27, 2026

(54) EYEWEAR WITH IR TRANSPARENT FRAME

(71) Applicants: Mathias Hintermann, Culver City, CA (US); Nicholas Streets, View Park, CA (US); Choonshin You, Irvine, CA (US); Bo Ya Zhang, Los Angeles, CA (US)

(72) Inventors: Mathias Hintermann, Culver City, CA (US); Nicholas Streets, View Park, CA (US); Choonshin You, Irvine, CA (US); Bo Ya Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 116 days.

(21) Appl. No.: 18/216,711

(22) Filed: Jun. 30, 2023

(51) Int. Cl.
*H04N 23/50* (2023.01)
*G02C 5/00* (2006.01)
*G02C 11/00* (2006.01)
*G06V 40/20* (2022.01)
*H04N 23/20* (2023.01)

(52) U.S. Cl.
CPC .............. *G02C 11/10* (2013.01); *G02C 5/001* (2013.01); *G06V 40/28* (2022.01); *H04N 23/20* (2023.01); *H04N 23/50* (2023.01)

(58) Field of Classification Search
CPC combination set(s) only.
See application file for complete search history.

(56) References Cited

U.S. PATENT DOCUMENTS

| | | | |
|---|---|---|---|
| 2019/0265508 A1* | 8/2019 | Castañeda | G02C 5/12 |
| 2021/0067764 A1* | 3/2021 | Shau | A61B 90/361 |
| 2021/0297584 A1* | 9/2021 | Moubedi | G02C 11/10 |
| 2022/0373796 A1* | 11/2022 | Meisenholder | G06V 20/20 |
| 2023/0063386 A1* | 3/2023 | Judi | G05D 1/101 |
| 2023/0298247 A1* | 9/2023 | Tham | H04L 65/1069 |
| | | | 345/633 |

* cited by examiner

*Primary Examiner* — Md N Haque
(74) *Attorney, Agent, or Firm* — CM Law; Stephen J. Weed

(57) ABSTRACT

An eyewear device having a frame formed of an infrared (IR) transmissive material in a continuous piece without discrete openings. IR cameras are placed behind areas of the frame designated as optical surfaces. In an example, the optical surfaces are positioned at lower corners of the frame and are angled inwardly to prevent obstructions, e.g., due to scratches and smudges. The optical surfaces have uniform thickness, are smooth, and are angled such that IR light communicated to the cameras pass at an angle through the optical surfaces. The IR cameras are angled downwardly to view objects forward and below a user wearing the eyewear device, e.g., to detect hand gestures.

20 Claims, 17 Drawing Sheets

EYEWEAR WITH IR TRANSPARENT FRAME

TECHNICAL FIELD

The present subject matter relates to an eyewear device, e.g., smart glasses.

BACKGROUND

Eyewear devices, such as smart glasses, headwear, and headgear available today integrate cameras and see-through displays. Conventional eyewear devices include frames that block infrared (IR) wavelengths of light.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
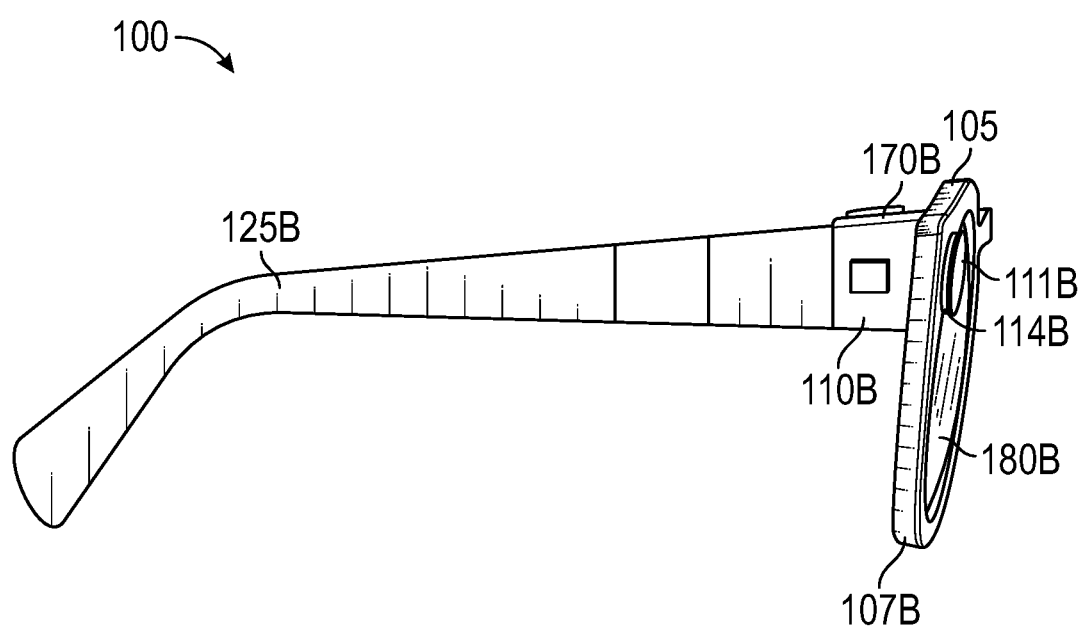
FIG. 1A is a side view of an example hardware configuration of an eyewear device, which shows an optical assembly with an image display, and field of view adjustments are applied to a user interface presented on the image display based on detected head or eye movement by a user.

An eyewear device having a frame formed of an infrared (IR) transmissive material in a continuous piece without discrete openings. IR cameras are placed behind areas of the frame designated as optical surfaces. In an example, the optical surfaces are positioned at lower corners of the frame and are angled inwardly to prevent obstructions, e.g., due to scratches and smudges. The optical surfaces have uniform thickness, are smooth, and are angled such that IR light communicated to the cameras pass at an angle through the optical surfaces. The IR cameras are angled downwardly to view objects forward and below a user wearing the eyewear device, e.g., to detect hand gestures.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 2A:
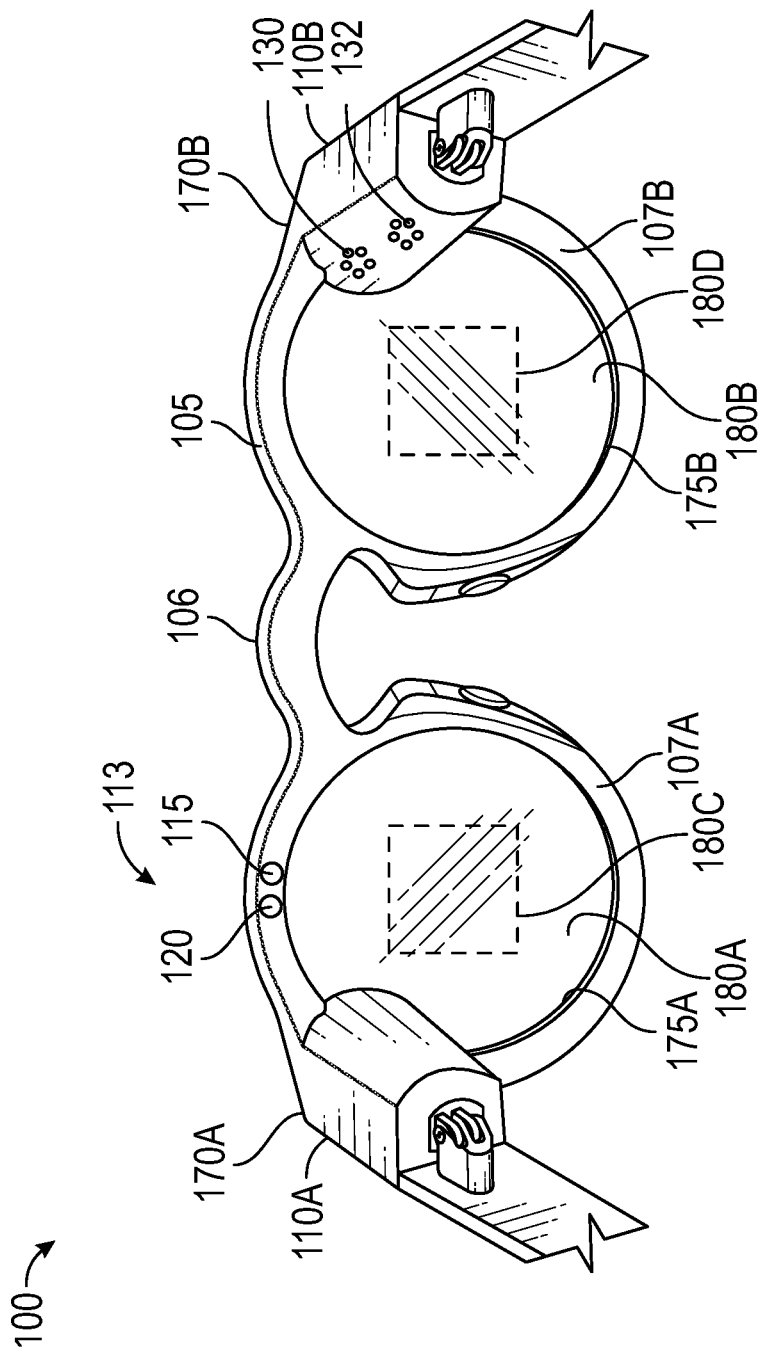
FIG. 2A is a rear view of an example hardware configuration of an eyewear device, which includes an eye scanner on a frame, for use in a system for identifying a user of the eyewear device.

FIG. 1A is a side view of an example hardware configuration of an eyewear device 100, which includes an optical assembly 180B (e.g., positioned on a right side of the eyewear device 100 as illustrated) with an image display 180D (FIG. 2A). Eyewear device 100 includes multiple visible light cameras 114A-B (FIG. 7) that form a stereo camera, of which the visible light camera 114B is located on a temple portion 110B.

The visible light cameras 114A-B (e.g., positioned on the left and sides of the eyewear device 100 as illustrated) have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor for digital processing along with a timestamp in which the image of the scene is captured. The image processor includes circuitry to receive signals from the visible light camera 114A-B and process those signals from the visible light cameras 114A-B into a format suitable for storage in a memory. The timestamp can be added by the image processor or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive lifelike experience, e.g., for virtual reality or video gaming. For stereoscopic vision, the pair of images 758A-B are generated at a given moment in time-one image for each of the visible light cameras 114A-B. When the pair of generated images 758A-B from the frontward facing angles of coverage 111A-B of the visible light cameras 114A-B are stitched together (e.g., by the image processor), depth perception is provided by the optical assembly 180A-B.

In an example, a user interface field of view adjustment system includes the eyewear device 100. The eyewear device 100 includes a frame 105, a temple portion 110B extending from a lateral side 170B of the frame 105, and a see-through image display 180D (FIGS. 2A-B) comprising optical assembly 180B to present a graphical user interface to a user. The eyewear device 100 includes a visible light camera 114A connected to the frame 105 or a temple portion 110A to capture an image of the scene. Eyewear device 100 further includes another visible light camera 114B connected to the frame 105 or another temple portion 110B to capture (e.g., at least substantially simultaneously with the visible light camera 114A) another image of the scene, which partially overlaps the image. Although not shown in FIGS. 1A-B, the user interface field of view adjustment system further includes a processor coupled to the eyewear device 100 and connected to the visible light cameras 114A-B, a memory accessible to the processor, and programming in the memory, for example in the eyewear device 100 itself or another part of the user interface field of view adjustment system.

Figure 1B:
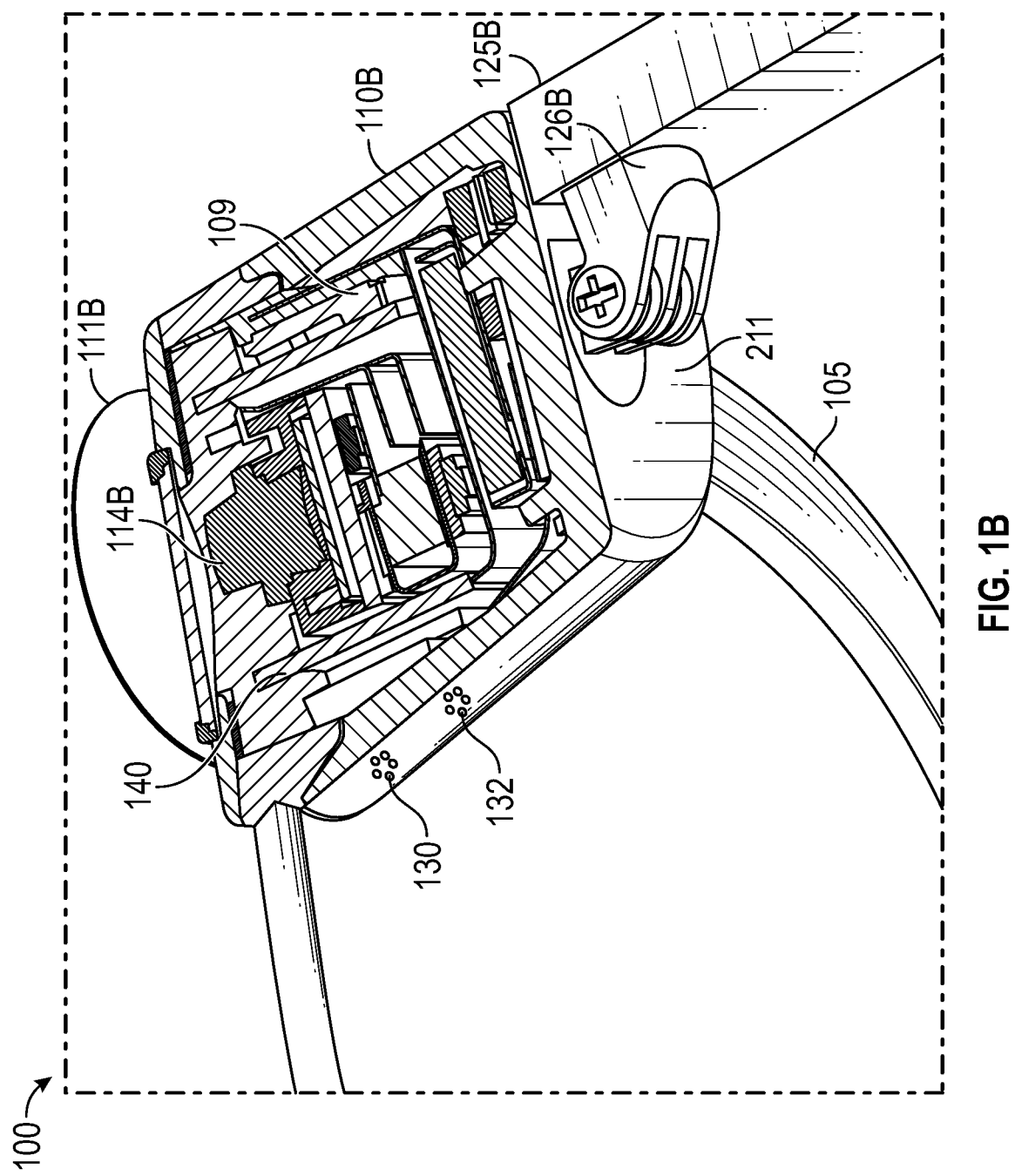
FIG. 1B is a top cross-sectional view of a temple of the eyewear device of FIG. 1A depicting a visible light camera, a head movement tracker for tracking the head movement of the user of the eyewear device, and a circuit board.
Figure 2B:
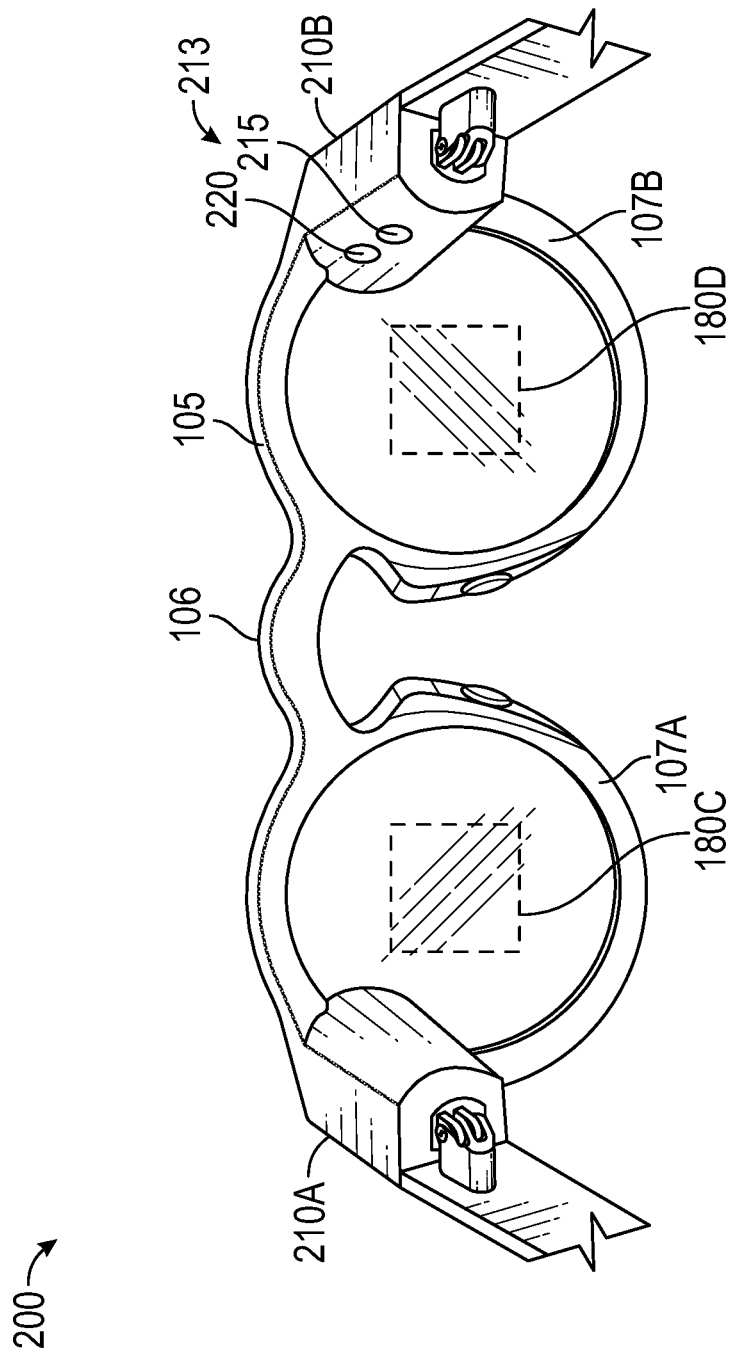
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker (element 109 of FIG. 1B) or an eye movement tracker (element 213 of FIG. 2B). Eyewear device 100 further includes the see-through image displays 180C-D of optical assembly 180A-B for presenting a sequence of displayed images, and an image display driver coupled to the see-through image displays 180C-D of optical assembly 180A-B to control the image displays 180C-D of optical assembly 180A-B to present the sequence of displayed images 715, which are described in further detail below. Eyewear device 100 further includes the memory and the processor having access to the image display driver and the memory. Eyewear device 100 further includes programming in the memory. Execution of the programming by the processor configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (element 230 of FIG. 5).

Execution of the programming by processor further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 213 of FIG. 2B, FIG. 5), an eye movement of an eye of the user of the eyewear device 100. Execution of the programming by the processor further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor further configures the eyewear device 100 to generate a successive displayed image of the sequence of displayed images based on the field of view adjustment. Execution of the programming by the processor further configures the eyewear device 100 to present, via the see-through image displays 180C-D of the optical assembly 180A-B, the successive displayed images.

FIG. 1B is a top cross-sectional view of the temple of the eyewear device 100 of FIG. 1A depicting the visible light camera 114B, a head movement tracker 109, and a circuit board. Construction and placement of the visible light camera 114A is substantially similar to the visible light camera 114B, except the connections and coupling are on the lateral side 170A. As shown, the eyewear device 100 includes the visible light camera 114B and a circuit board, which may be a flexible printed circuit board (PCB) 140. The hinge 126B connects the temple portion 110B to a temple 125B of the eyewear device 100. In some examples, components of the visible light camera 114B, the flexible PCB 140, or other electrical connectors or contacts may be located on the temple 125B or the hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The temple portion 110B includes temple body 211 and a temple cap, with the temple cap omitted in the cross-section of FIG. 1B. Disposed inside the temple portion 110B are various interconnected circuit boards, such as PCBs or flexible PCBs, that include controller circuits for visible light camera 114B, microphone(s) 130, speaker(s) 132, low-power wireless circuitry (e.g., for wireless short-range network communication via Bluetooth™), high-speed wireless circuitry (e.g., for wireless local area network communication via WiFi).

The visible light camera 114B is coupled to or disposed on the flexible PCB 140 and covered by a visible light camera cover lens, which is aimed through opening(s) formed in the temple portion 110B. In some examples, the frame 105 connected to the temple portion 110B includes the opening(s) for the visible light camera cover lens. The frame 105 includes a front-facing side configured to face outwards away from the eye of the user. The opening for the visible light camera cover lens is formed on and through the front-facing side. In the example, the visible light camera 114B has an outwards facing angle of coverage 111B with a line of sight or perspective of an eye (e.g., right eye) of the user of the eyewear device 100. The visible light camera cover lens can also be adhered to an outwards facing surface of the temple portion 110B in which an opening is formed with an outwards facing angle of coverage, but in a different outwards direction. The coupling can also be indirect via intervening components.

A visible light camera 114A is connected to the see-through image display 180C of optical assembly 180A to generate a background scene of a successive displayed image. Another visible light camera 114B is connected to the see-through image display 180D of optical assembly 180B to generate another background scene of a successive displayed image. The background scenes partially overlap to present a three-dimensional observable area of the successive displayed image.

Flexible PCB 140 is disposed inside the temple portion 110B and is coupled to one or more other components housed in the temple portion 110B. Although shown as being formed on the circuit boards of the temple portion 110B, the visible light camera 114B can be formed on the circuit boards of the temple portion 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the rim 107A connected to the rim 107B via the bridge 106 adapted for a nose of the user. The rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the temple portion 110A adjacent the lateral side 170A of the frame 105 and the temple portion 110B adjacent the lateral side 170B of the frame 105. The temple portions 110A-B may be integrated into the frame 105 on the respective sides 170A-B (as illustrated) or implemented as separate components attached to the frame 105 on the respective sides 170A-B. Alternatively, the temple portions 110A-B may be integrated into the temples 125A-B or other pieces (not shown) attached to the frame 105.

In the example of FIG. 2A, the eye scanner 113 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the rim 107A. The frame 105 or one or more of the temple portions 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the rim 107B, or in different locations on the frame 105, for example, the infrared emitter 115 is on the rim 107A and the infrared camera 120 is on the rim 107B. In another example, the infrared emitter 115 is on the frame 105 and the infrared camera 120 is on one of the temple portions 110A-B, or vice versa. The infrared emitter 115 can be connected essentially anywhere on the frame 105, temple portion 110A, or temple portion 110B to emit a pattern of infrared light. Similarly, the infrared camera 120 can be connected essentially anywhere on the frame 105, temple portion 110A, or temple portion 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the temple portions 110A-B at either end of the frame 105.

FIG. 2B is a rear view of an example hardware configuration of another eyewear device 200. In this example configuration, the eyewear device 200 is depicted as including an eye scanner 213 on a temple 210B. As shown, an infrared emitter 215 and an infrared camera 220 are co-located on the temple 210B. It should be understood that the eye scanner 213 or one or more components of the eye scanner 213 can be located on the temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a rim 107A which is connected to a rim 107B via a bridge 106; and the rims 107A-B include respective apertures which hold the respective optical elements 180A-B comprising the see-through display 180C-D.

Figure 2C:
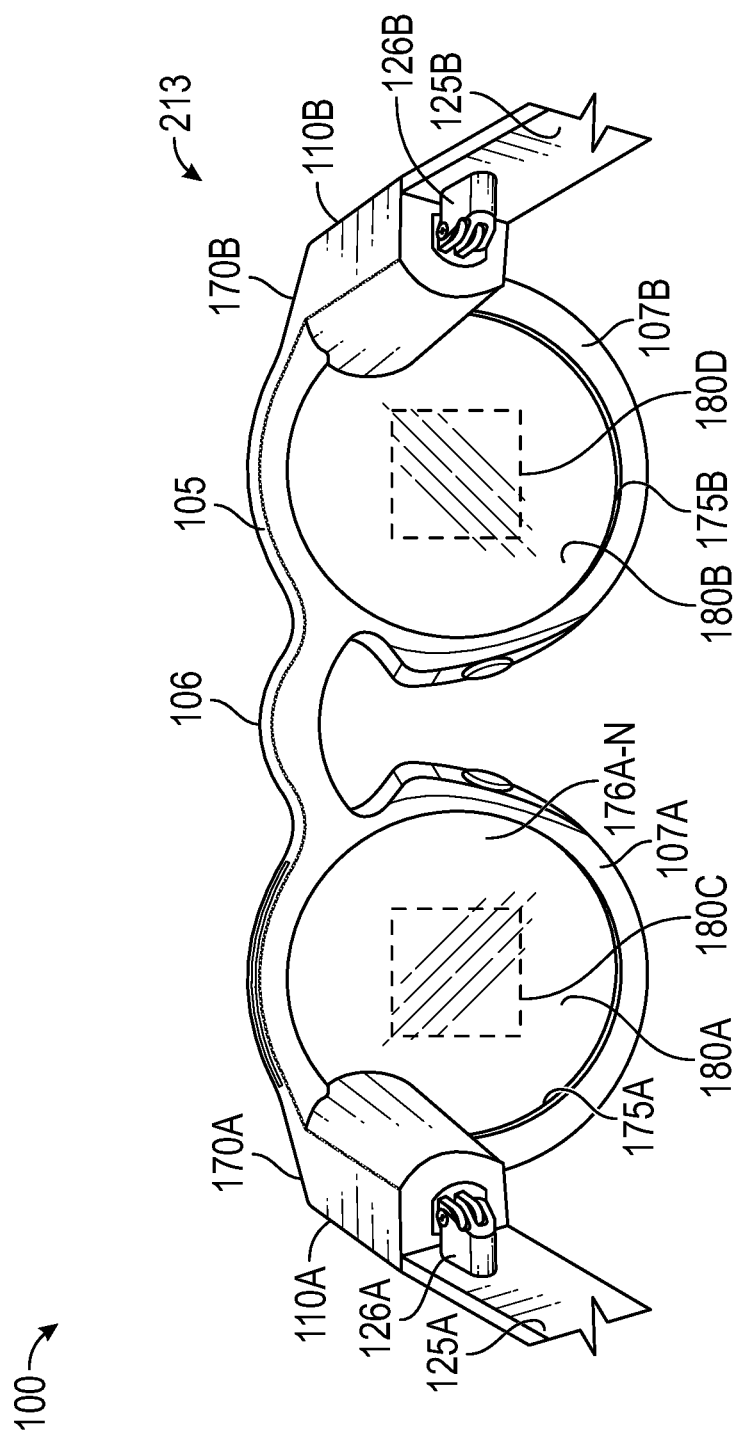
FIGS. 2C and 2D are rear views of example hardware configurations of the eyewear device, including two different types of image displays.
Figure 2D:
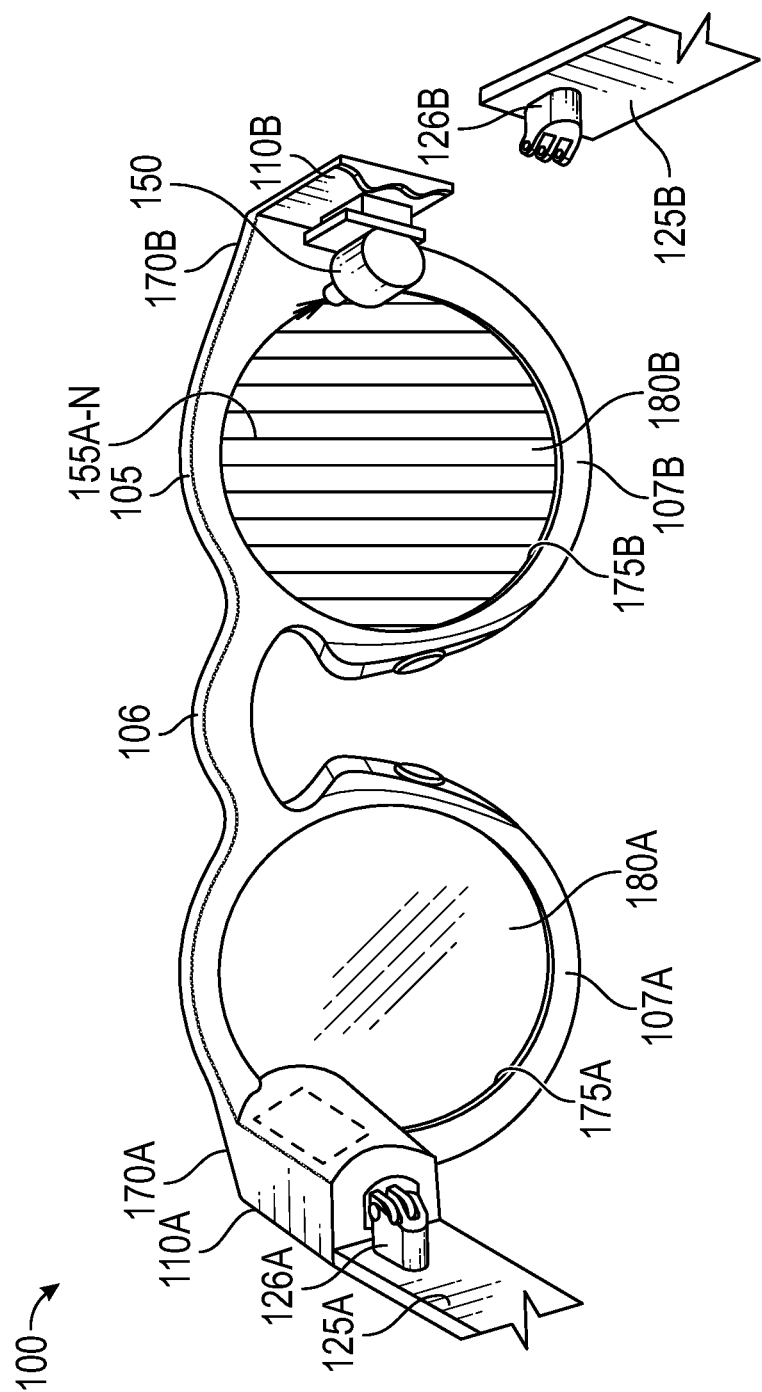

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a surface (e.g., first) for receiving light from display matrix and another surface (e.g., second) for emitting light to the eye of the user. The prism of the optical layers 176A-N extends over all or at least a portion of the respective apertures 175A-B formed in the rims 107A-B to permit the user to see the other surface of the prism when the eye of the user is viewing through the corresponding rim 107A-B. The surface of the prism of the optical layers 176A-N receiving light faces upwardly from the frame 105 and the display matrix overlies the prism so that photons and light emitted by the display matrix impinge the surface. The prism is sized and shaped so that the light is refracted within the prism and is directed towards the eye of the user by the other surface of the prism of the optical layers 176A-N. In this regard, the other surface of the prism of the optical layers 176A-N can be convex to direct the light towards the center of the eye. The prism can optionally be sized and shaped to magnify the image projected by the see-through image displays 180C-D, and the light travels through the prism so that the image viewed from the other surface is larger in one or more dimensions than the image emitted from the see-through image displays 180C-D.

In another example, the see-through image displays 180C-D of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a temple portion 110A adjacent the lateral side 170A of the frame 105 and a temple portion 110B adjacent the lateral side 170B of the frame 105. The temple portions 110A-B may be integrated into the frame 105 on the respective lateral sides 170A-B (as illustrated) or implemented as separate components attached to the frame 105 on the respective sides 170A-B. Alternatively, the temple portions 110A-B may be integrated into temples 125A-B attached to the frame 105.

In one example, the see-through image displays include the see-through image display 180C and the see-through image display 180D. Eyewear device 100 includes apertures 175A-B, which hold respective optical assemblies 180A-B. The optical assembly 180A includes the see-through image display 180C (e.g., a display matrix of FIG. 2C or optical strips and a projector not shown)). The optical assembly 180B includes the see-through image display 180D (e.g., a display matrix of FIG. 2C (not shown) or optical strips 155A-N and a projector 150)). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the image displays.

As used herein, "an angle of view" describes the angular extent of the field of view associated with the displayed images presented on each of the image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
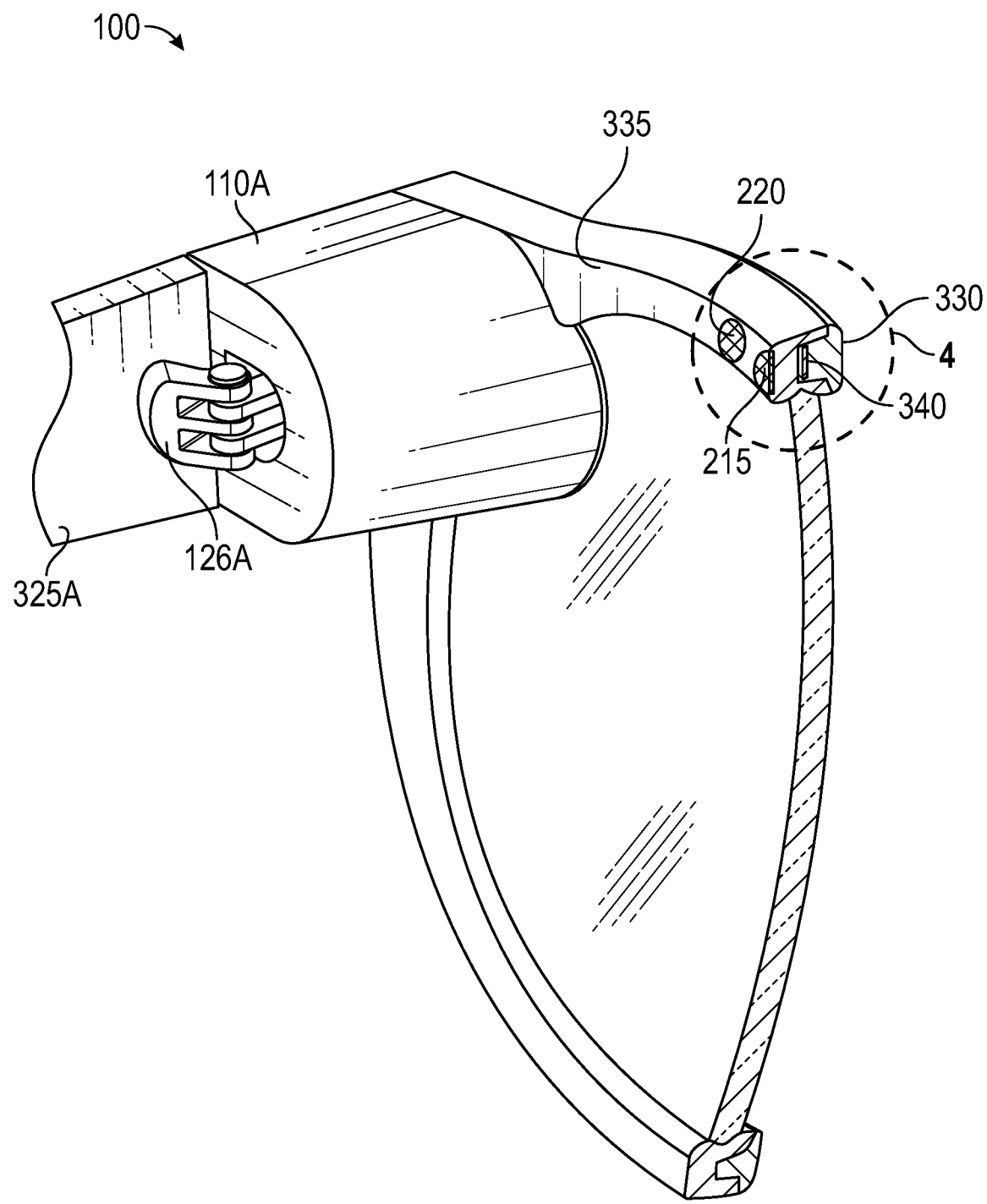
FIG. 3 is a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the rim of the frame of the eyewear device 100 includes the frame front 330 and the frame back 335. An opening for the infrared emitter 215 is formed on the frame back 335.

As shown in the encircled cross-section 4 in the upper middle portion of the rim of the frame, a circuit board, which is a flexible PCB 340, is sandwiched between the frame front 330 and the frame back 335. Also shown in further detail is the attachment of the temple portion 110A to the temple 325A via the hinge 126A. In some examples, components of the eye movement tracker 213, including the infrared emitter 215, the flexible PCB 340, or other electrical connectors or contacts may be located on the temple 325A or the hinge 126A.

Figure 4:
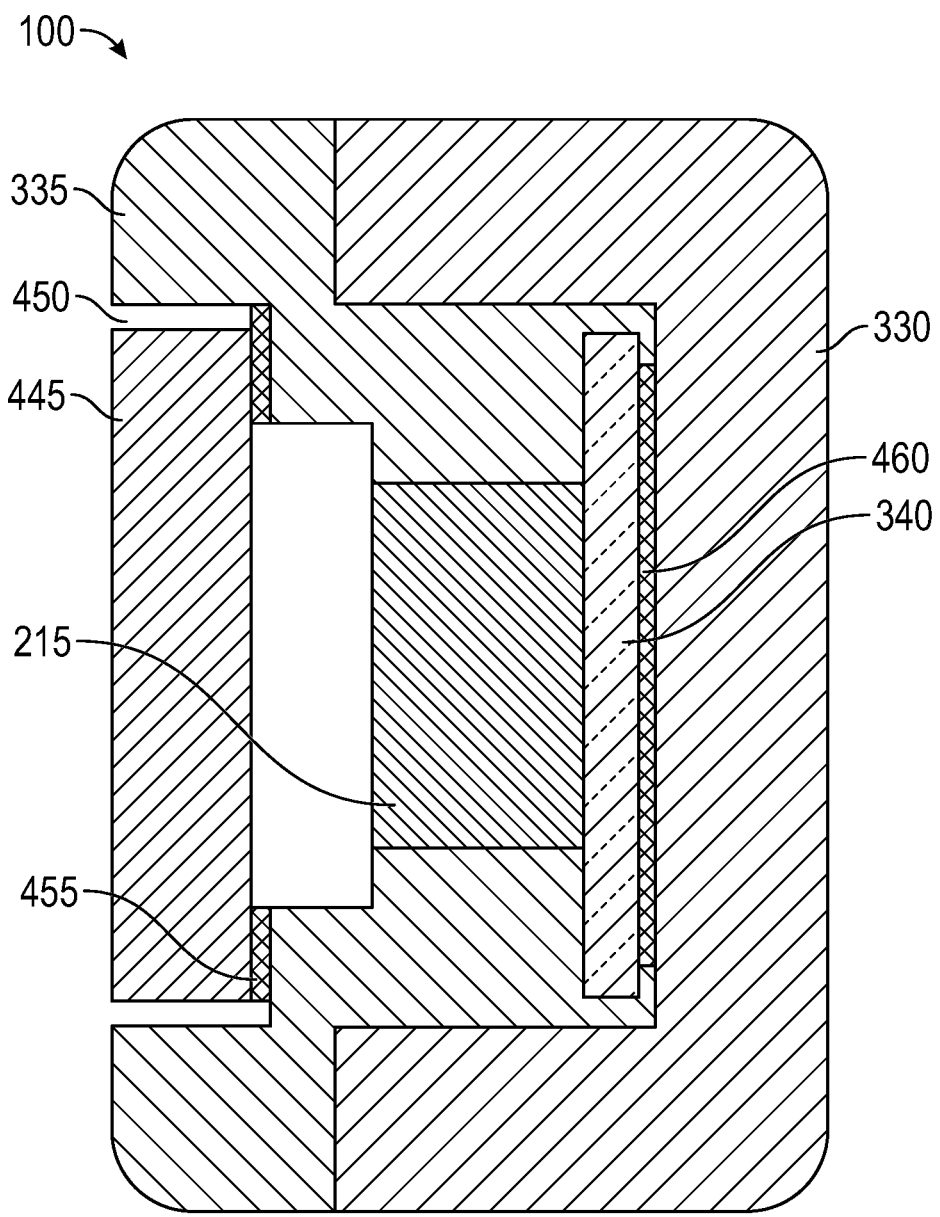
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
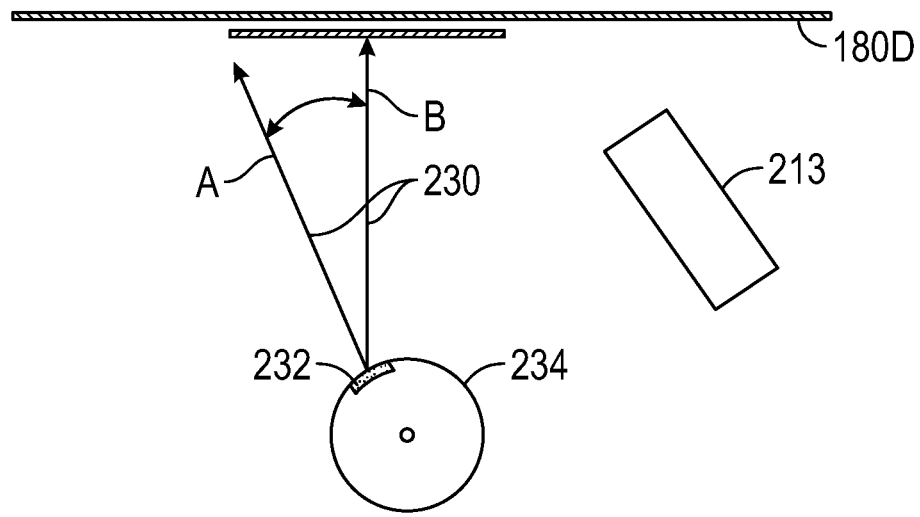
FIG. 5 is an illustration depicting detection of eye gaze direction.
Figure 6:
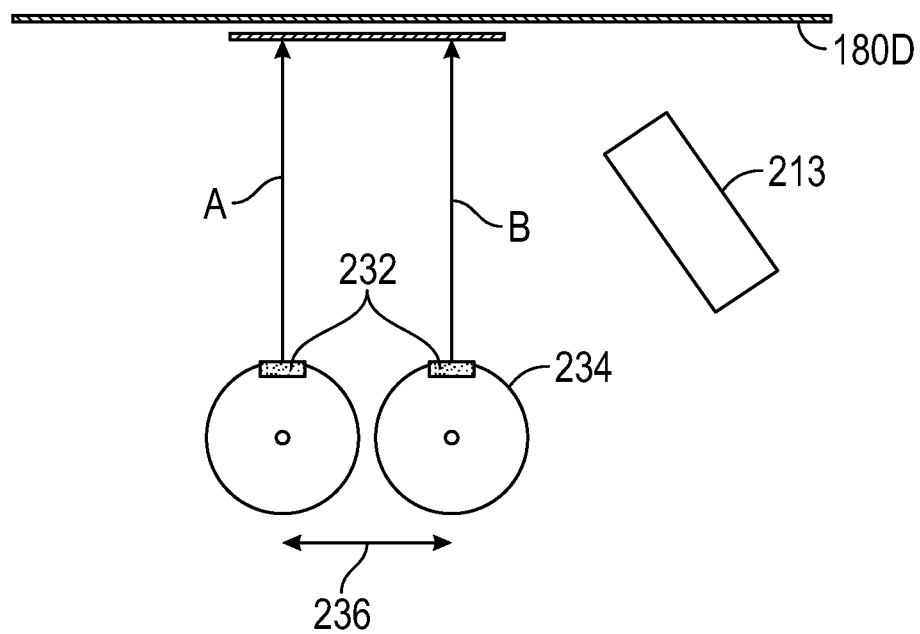
FIG. 6 is an illustration depicting detection of eye position.

In an example, a processor utilizes eye tracker 213 to determine an eye gaze direction 230 of a wearer's eye 234 as shown in FIG. 5, and an eye position 236 of the wearer's eye 234 within an eyebox 844b as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
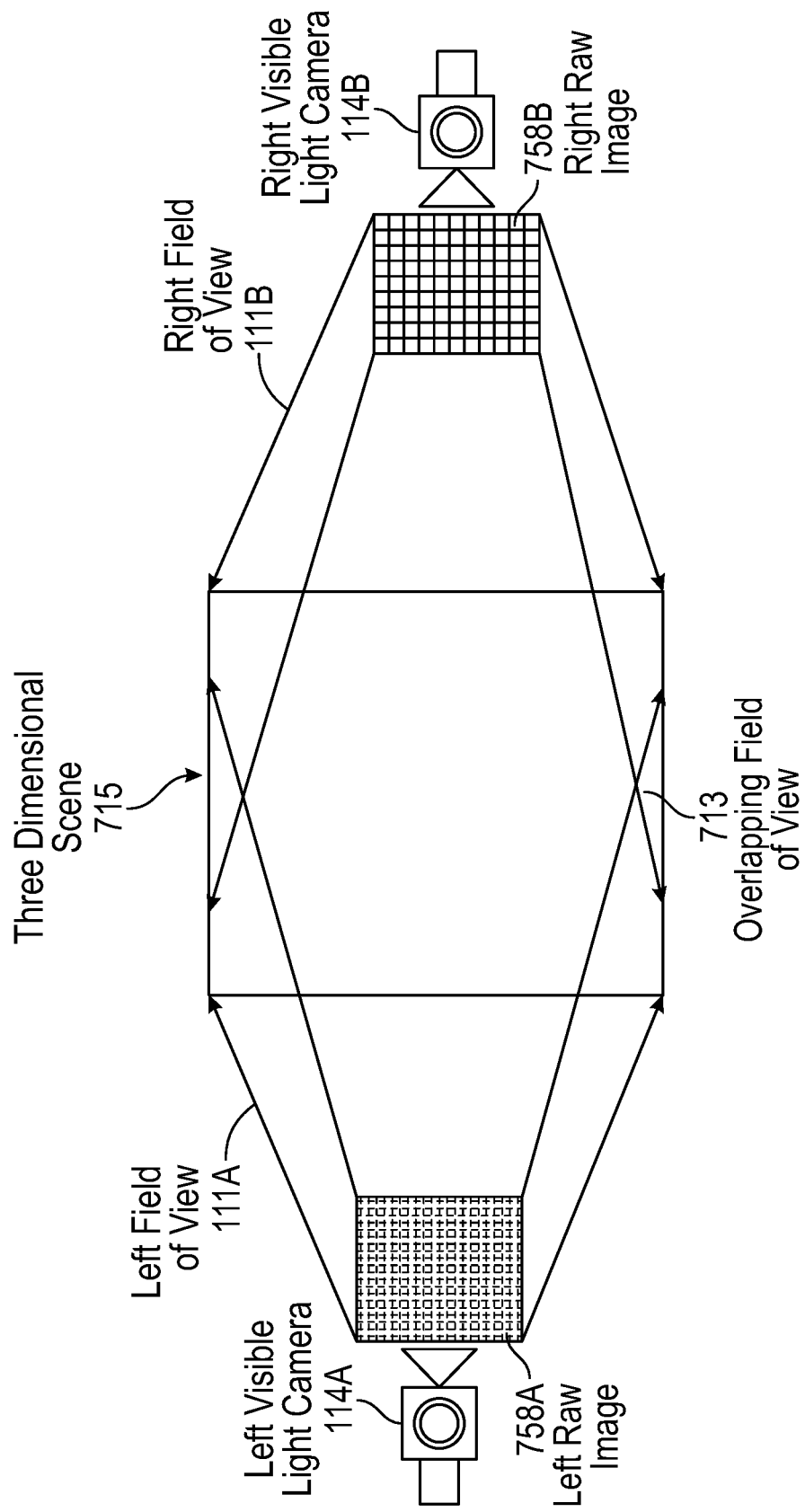
FIG. 7 is an illustration depicting an example of visible light captured by the visible light cameras as raw images.

FIG. 7 depicts an example of capturing visible light with cameras. Visible light is captured by the visible light camera 114A with a visible light camera field of view 111A as a raw image 758A. Visible light is captured by the visible light camera 114B with a visible light camera field of view 111B (having an overlap 713 with the field of view 111A) as a raw image 758B. Based on processing of the raw image 758A and the raw image 758B, a three-dimensional depth map 715 of a three-dimensional scene, referred to hereafter as an image, is generated by a processor.

Cameras used for hand tracking and other computer vision (CV) functions need to be protected behind a cover lens in a consumer product. These windows are typically glass for their scratch resistance, flatness, and transparency. However, on a face or head-mounted device, such as smart eyewear, the appearance of many openings or windows for sensors/cameras is undesirable for the user and can appear aesthetically off-putting.

Figure 8:
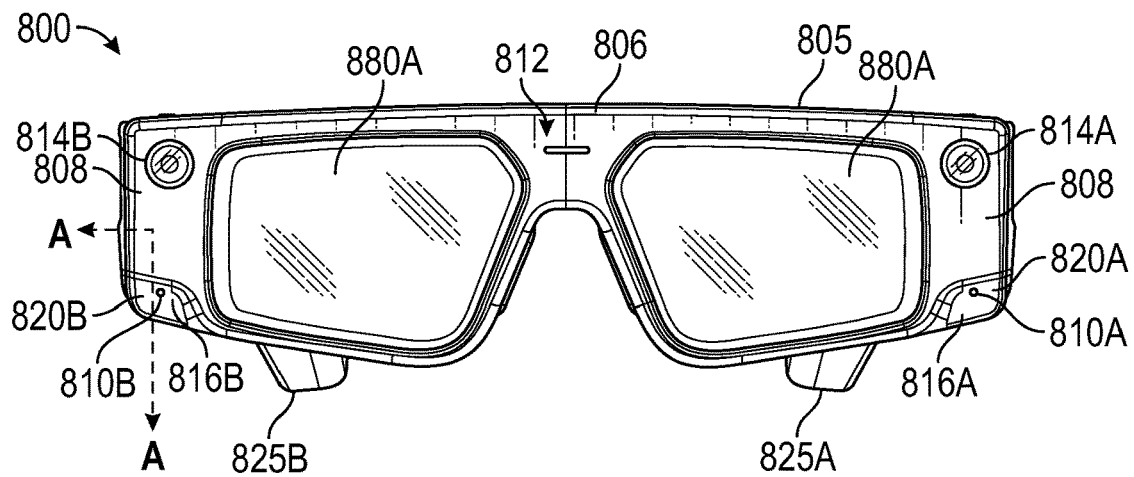
FIG. 8 is a front view of an eyewear device having a frame formed of an IR transmissive material.
Figure 14:
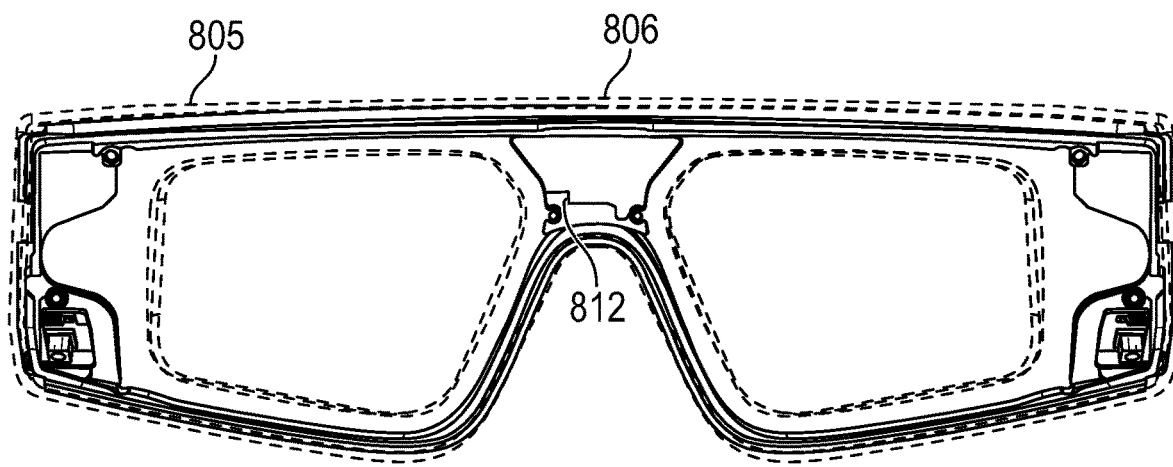
FIG. 14 is a front view of the rear portion of frame including IR LEDs and other sensors on the bridge.

FIG. 8 is an illustration of eyewear device 800 having a frame 805 formed of an IR transmissive material, such as plastic, as a continuous piece without discrete openings for glass windows. Frame 805 has a bridge 806 and a front frame face 808 that is generally planar. Infrared (IR) cameras 810A and 810B are positioned behind respective optical receiving surfaces 816A and 816B of frame 805. The illustrated optical receiving surfaces 816A and 816B are implemented as respective beveled lower corners 820A and 820B of frame 805. The beveled lower corners 820A and 820B are edges of frame 805 that are not perpendicular to frame face 808. IR light emitting diodes (LEDs) 812 (for use in low IR light conditions) and sensors are placed behind areas of frame 805 as well, including within bridge 806 (FIG. 14). Frame geometry and injection molding techniques are used to optimize the plastic quality for optical use. Eyewear device 800 has forward facing cameras 814A and 814B, displays 880A and 880B, and temples 825A and 825B that are similar in structure and function to the respective like elements shown in FIG. 1A. Cameras 810A and 810B process the received IR light to detect images.

Cameras 810A and 810B face angle A (FIG. 13C) such that, for example, hand gestures presented by a user of eyewear device 800 in front of the eyewear device 800 are detected. Cameras 810A and 810B capture high quality images of the remote object as the frame is formed of IR transmissive material.

Plastic is favorable for a head mounted device such as eyewear device 800 due to its low mass, impact resistance, and ability to be molded into a complex geometry. However, unlike glass, plastic (and especially PC) is generally undesirable as an optical window, such as an IR window, because it typically has low optical quality and low scratch resistance. Injection molded PC may distort and blur an image when placed in front of a camera. Additionally, an optical surface that is scratched affects image quality.

Examples described herein address these issues in a few ways. The geometry of frame 805 and the manufacturing process improves the injection molding conditions at optical surfaces 816A and 816B covering cameras 810A and 810B, as well as IR LEDs 812. In addition, the geometry of frame 805 shields optical surfaces 816A and 816B from being the first point of contact in the event the eyewear device 800 drop or handling. The surrounding geometry of frame 805 around the beveled lower corners 820A and 820B act as bumpers that protect optical surfaces 816A and 816B. This reduces the frequency or likelihood that scratching occurs on optical surfaces 816A and 816B.

During manufacturing, the surface of the plastic at optical surfaces 816A and 816B is treated with an ultraviolet (UV) hard coat and also an anti-smudge coating, such that in the event of a scratch, the severity of the scratch is reduced and the optical clarity of optical surfaces 816A and 816B are preserved. These coatings also enhance the baseline optical quality of the plastic and smooth the surface of optical surfaces 816A and 816B. These solutions enable the cameras 810A and 810B paired with frame 805 to produce images of high enough quality, such as for use with a hand tracker.

Figure 9:
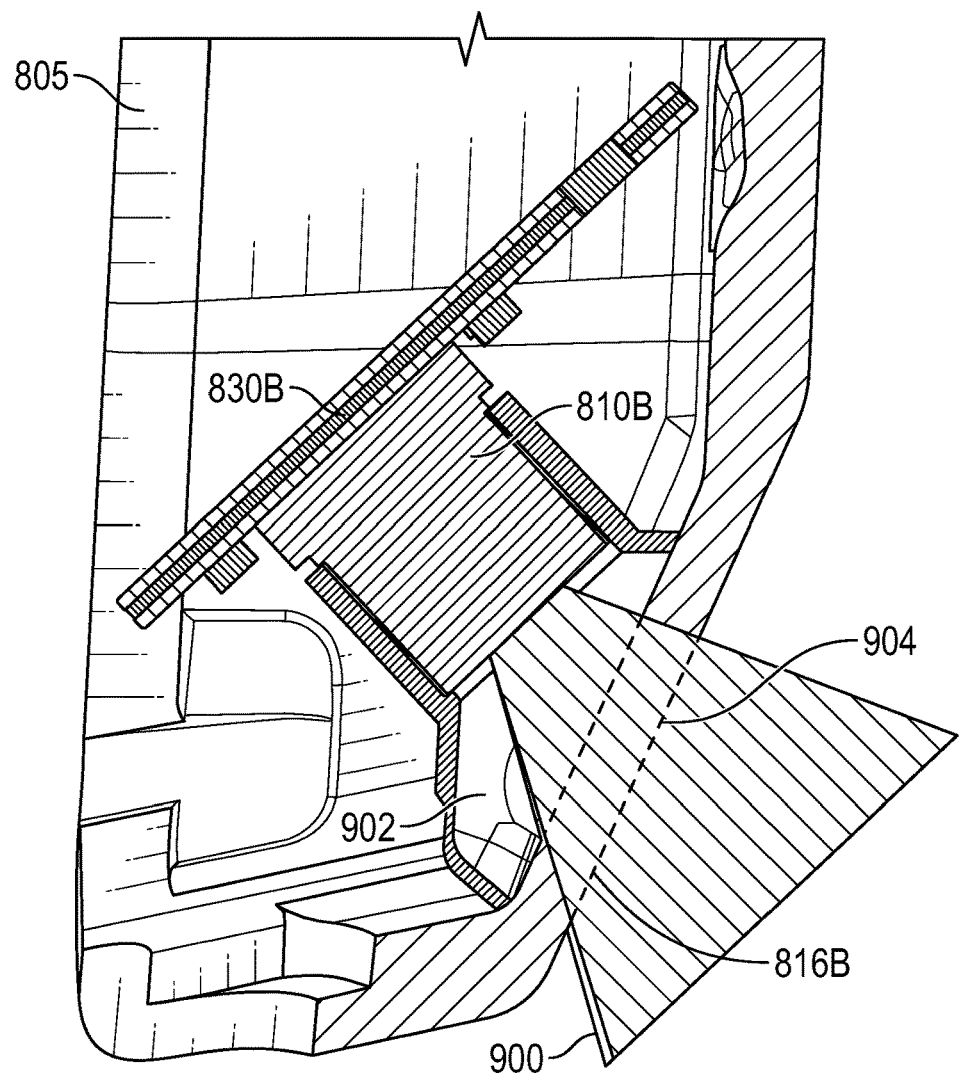
FIG. 9 is an illustration of a cross section of the frame taken along line A-A at the optical surface in FIG. 8.

FIG. 9 is an illustration of a cross section of frame 805 taken along line A-A at optical surface 820B in FIG. 8. The camera 810B field of view (FOV) is shown at 900. A cavity 902 is formed in beveled lower corner 820B of frame 805 and extends between camera 810B and optical surface 816B and creates an unobstructed camera view of optical surface 816B. Camera 810B is coupled to a camera printed circuit board (PCB) 830 having electronics that control operation of camera 810B. Camera 810B and PCB 830B are secured in cavity 902, and PCB 830B is coupled within frame 805 such that PCB 830B is angled with respect to frame face 808 and faces optical surface 816B. A portion 904 of frame 805 including optical surface 816B that camera 810B looks through is planar and without curvature to prevent image distortion. Portion 904 is a segment of frame 805 and is smooth on both sides without surface imperfections. In an example, both sides of portion 904 are polished. Portion 904 has a uniform thickness where FOV 900 intersects. This configuration is the same for camera 810A at beveled lower corner 820A.

Figure 10:
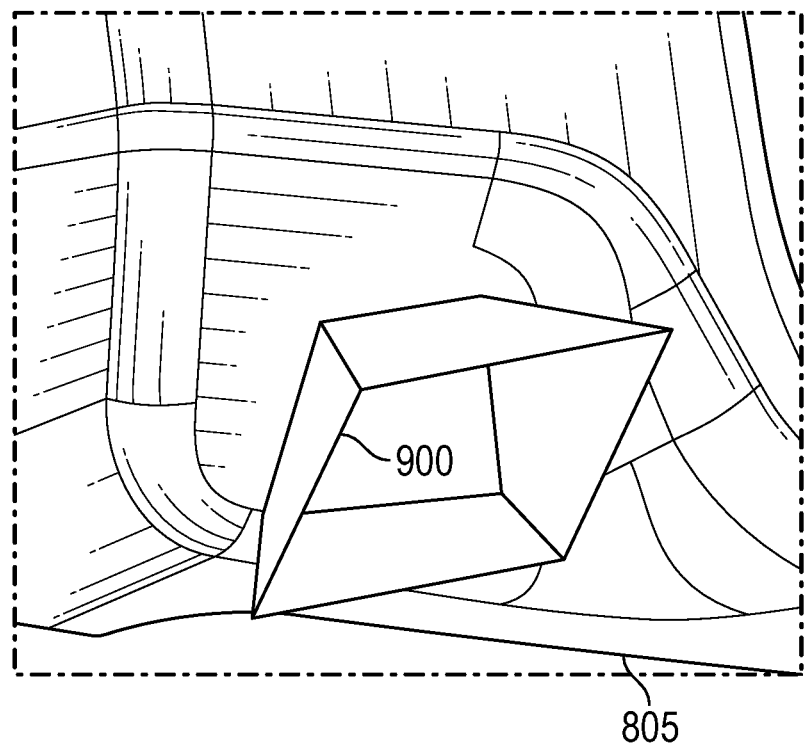
FIG. 10 is a perspective view of the camera FOV of the camera shown in FIG. 9.

FIG. 10 is an illustration showing a perspective view of FOV 900 of camera 810B shown in FIG. 9. FOV 900 is directed towards optical surface 816B at an angle with respect to frame face 808 (FIG. 8). FIG. 10 illustrates the angle of the FOV 900 as it is directed towards optical surface 816B.

Figure 11:
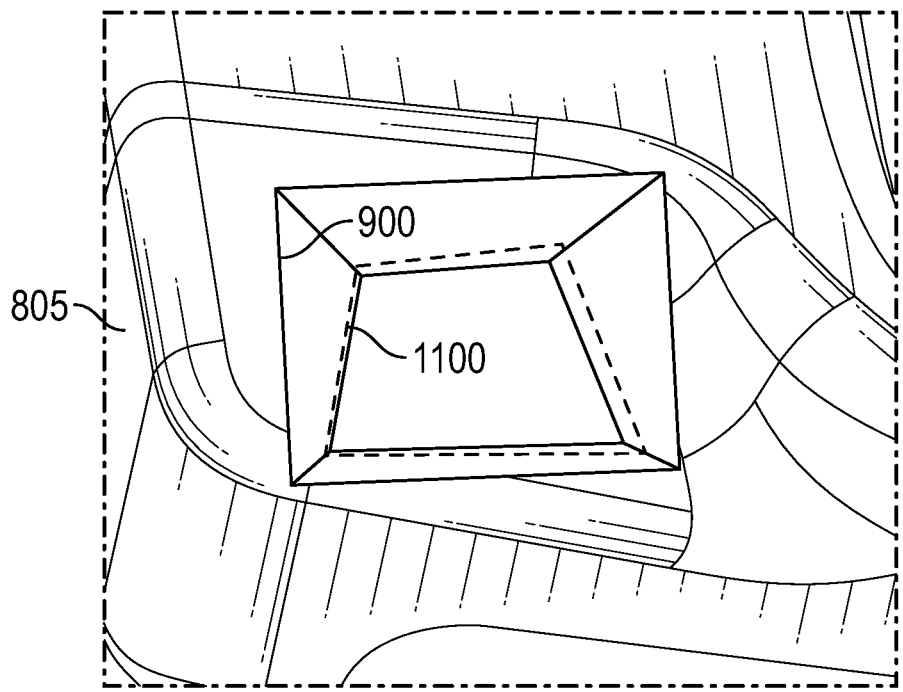
FIG. 11 is an illustration of the camera FOV depicting where the camera is directed through the frame at the optical surface.

FIG. 11 is an illustration depicting FOV 900 where camera 810B is positioned to sense light passing through frame 805 proximate optical surface 816B, shown as a FOV intersection 1100. The FOV intersection 1100 has a generally trapezoidal perimeter as the angle of FOV 900 is not perpendicular to portion 904, as shown in FIG. 9.

Figure 12:
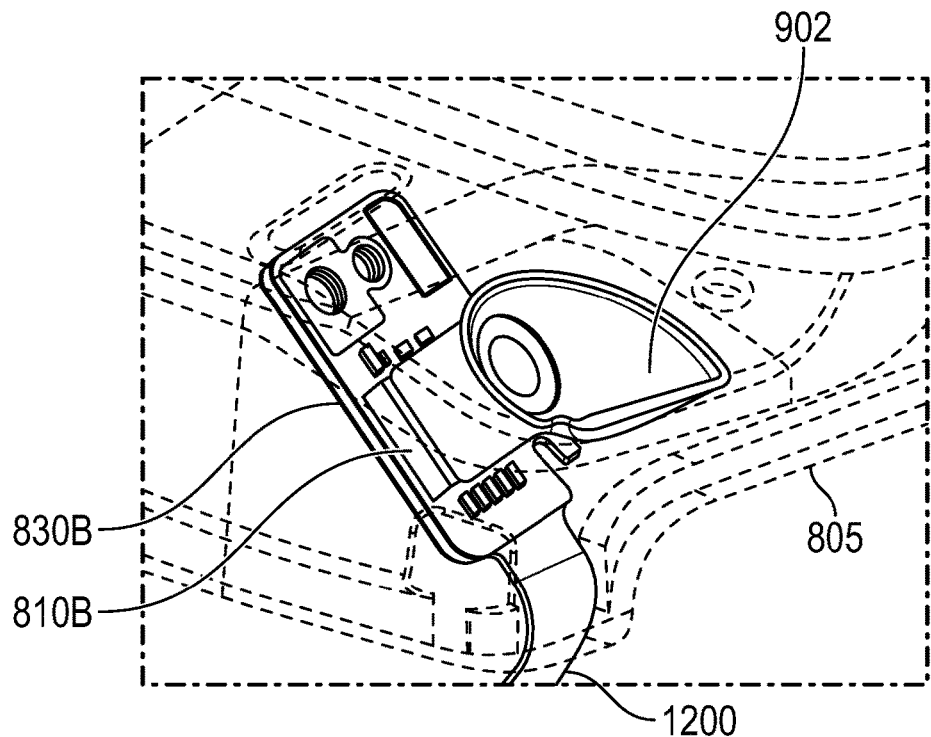
FIG. 12 is a perspective view of the camera from behind the frame and the PCB.

FIG. 12 is an illustration showing a perspective view of camera 810B from behind frame 805 and PCB 830B. A flex circuit board 1200 electrically couples PCB 830B to a controller (not shown). Cavity 902 extends from camera 810B as shown.

Figure 13A:
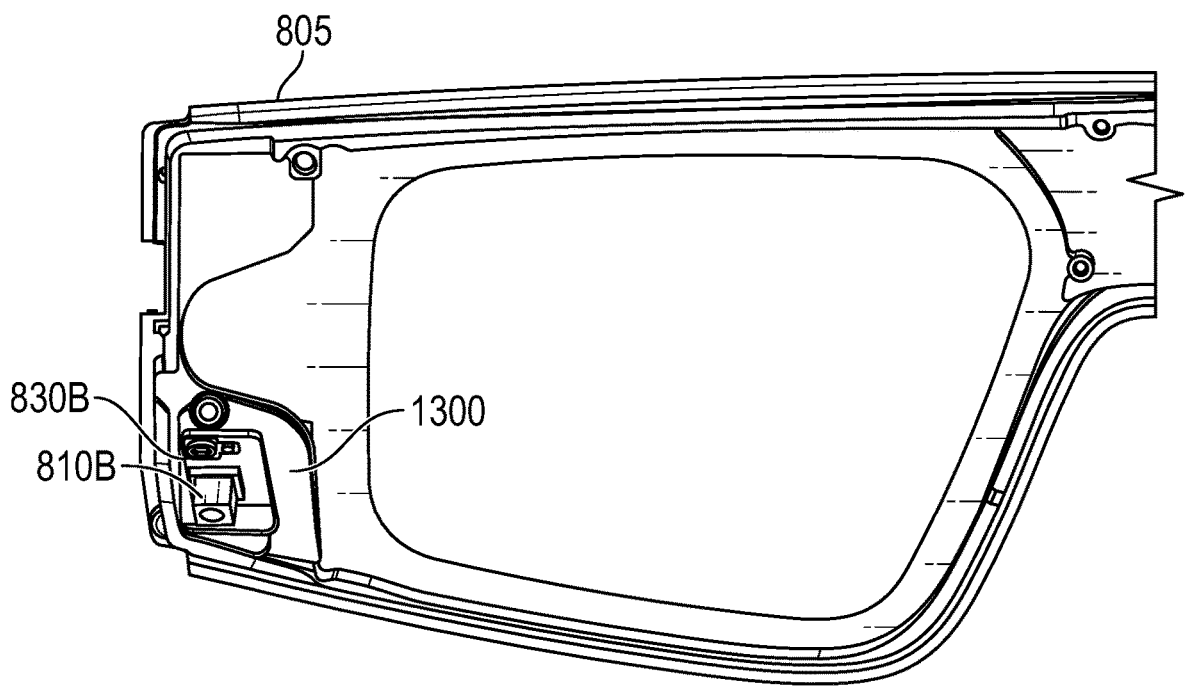
FIG. 13A is a front view of a rear portion of the frame with a front portion removed to illustrate the positioning of the camera and the PCB.

FIG. 13A is an illustration showing a perspective view of a rear portion of frame 805 with a front portion removed to illustrate the positioning of camera 810B and PCB 830B. Frame 805 has a recess 1300 at beveled lower corner 820B that securing receives both camera 810B and PCB 830B.

Figure 13B:
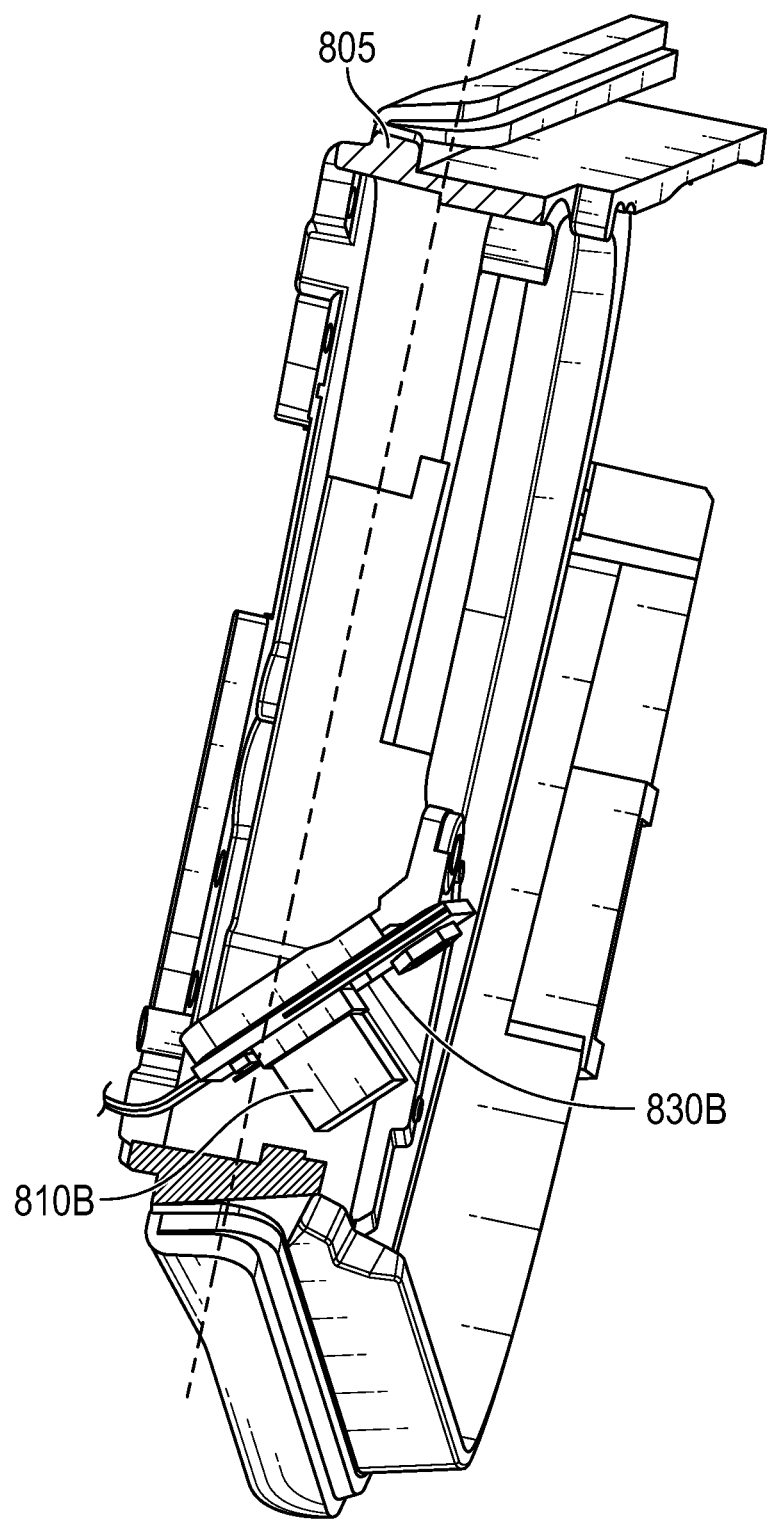
FIG. 13B is a perspective view of the frame shown in FIG. 13A illustrating the camera and the PCB angled with respect to the face of frame.

FIG. 13B is an illustration of a side view of frame 805 illustrating camera 810B and PCB 830B angled with respect to the width of frame 805. Camera 810B and PCB 830B are angled forward and downward, such as to detect hand gestures presented by a user in front of camera 810B.

Figure 13C:
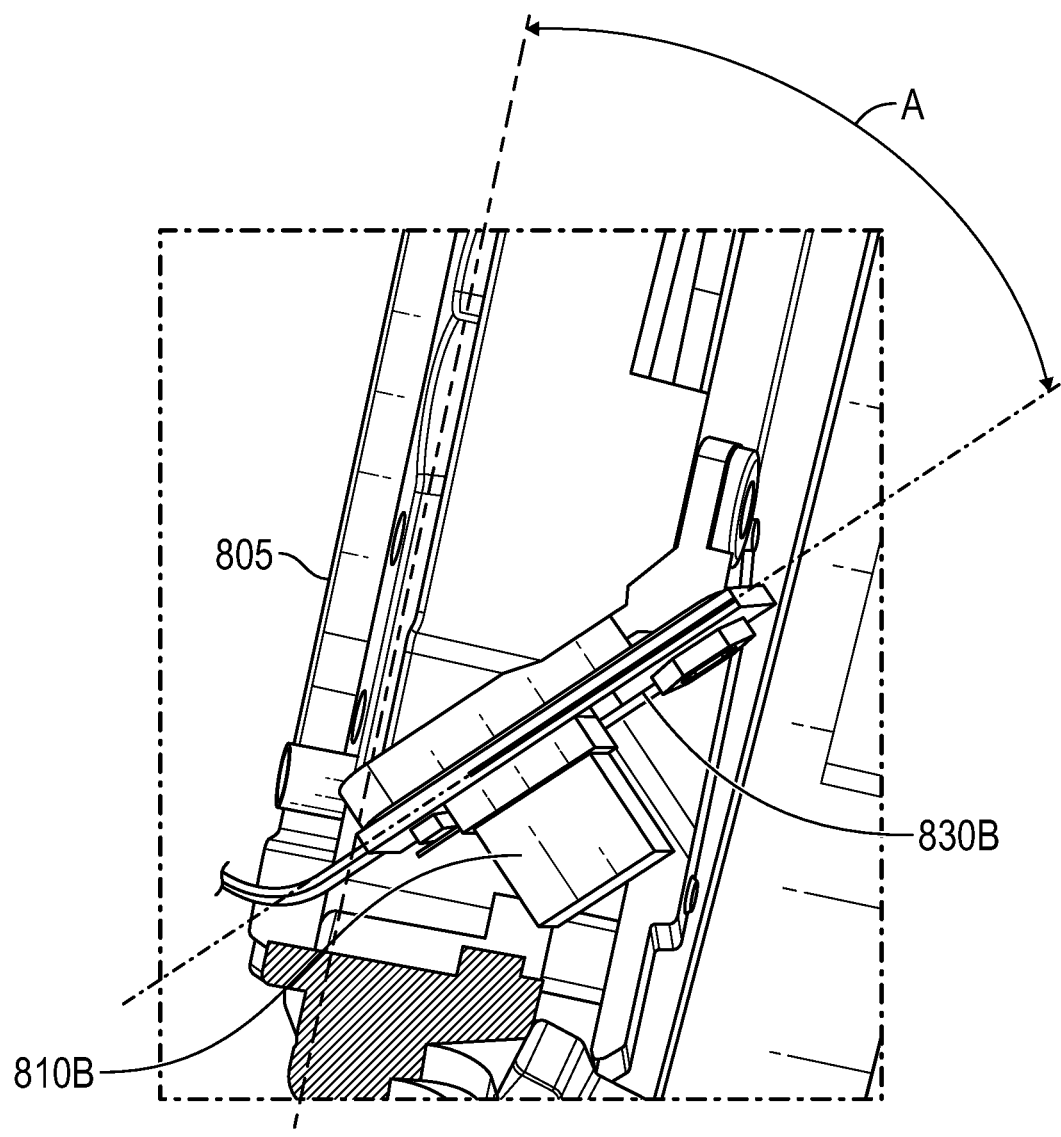
FIG. 13C is a top view of a top portion of the frame.

FIG. 13C is an illustration of an enlarged view of camera 810B and PCB 830B shown in FIG. 13B angled at angle A with respect to frame 805. Angle A is the angle between an imaginary line extending along the width of frame 805 (device angle) and the camera angle. Angle A is the angle that camera 810B is mounted into frame 805 and is determined by a user experience (UX), human factors engineering, and optical engineering. Camera angle A can vary depending on frame design. In a non-limiting example, angle A may be 44.5 degrees. The camera directed at angle A is suitable for tracking hand gestures generated below eyewear 800 when worn by a user.

FIG. 14 is a front view of the rear portion of frame 805 including IR LEDs 812 and other sensors on bridge 806. Frame 805 allows IR LEDs 812 and other sensors to be hidden behind frame 805. A separate opening in front portion of frame 805 (not shown) is not needed since the entire frame 805 is IR transparent.

An IR transparent material forming frame 805 is commercially available. In an example, frame 805 is comprised substantially of an IR transparent material, where substantially is defined as more than 50% of the frame. In another example, frame 805 is formed entirely of an IR transparent material. In a non-limiting example, the material may be a resin. In polymer chemistry and materials science, a resin is a solid or highly viscous substance of plant or synthetic origin that is typically convertible into polymers. Resins are usually mixtures of organic compounds. In an example, the resin can be LG Lupoy® LZ1000U available from LG of Seoul Korea. The color code for IR transparent black is K1892. This material is highly IR transparent, and also very visibly opaque. Other stray light generated inside of frame 805 is blocked by this material in the visible spectrum while still letting IR light pass through.

Figure 15:
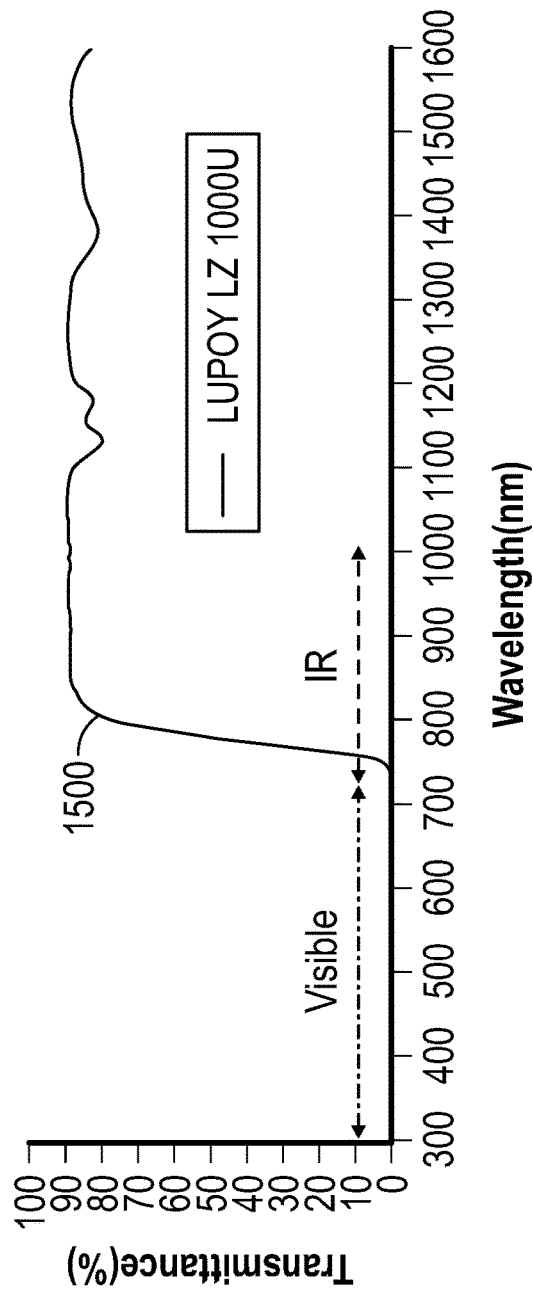
FIG. 15 is a graph of the transmission by a material in the visible and IR spectrums.

FIG. 15 is a graph 1500 of the transmission by this material in the visible and IR spectrum. As illustrated, the resin is optically opaque in the visible light spectrum, and very IR transparent in the IR spectrum. In an example, the example resin is around 90 percent IR transparent.

Poly(methyl methacrylate) (PMMA) is a synthetic polymer derived from methyl methacrylate. Being an engineering plastic, PMMA is a transparent thermoplastic. PMMA is also known as acrylic, acrylic glass, as well as by the trade names and brands Crylux®, Alfaplas®, Plexiglas®, Acrylite®, Lucite®, and Perspex®, among several others. During testing, while PMMA is an IR transparent material, it was determined to be unreliable for use in an eyewear device as it is susceptible to damage, such as during use and when dropped.

Figure 16:
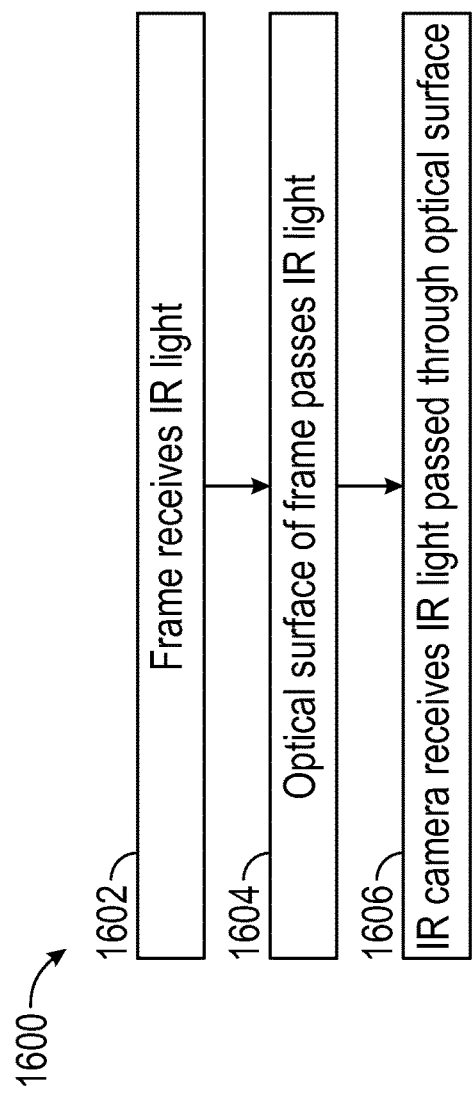
FIG. 16 is a flow diagram of a method of using an eyewear device.

FIG. 16 is a flow diagram 1600 of a method of using eyewear device 800.

At step 1602, optical surfaces 816A and 816B of frame 805 receive IR light from a source remote from eyewear device 805, such as an object in front of eyewear 805. In an example, the IR light may be reflected by a hand gesture produced by a user wearing frame 805.

At step 1604, the IR light from the source passes through the IR transmissive optical surfaces 816A and 816B and portion 904 to respective IR cameras 810A and 810B. The IR light passes through optical surfaces 816A and 816B at an angle that is non-perpendicular to the optical surfaces 816A and 816B. The UV treated and polished optical surfaces 816A and 816B do not distort the IR light.

At step 1606, cameras 810A and 810B receive the IR light that passes through optical surfaces 816A and 816B and portion 904. Cameras 810A and 810B process the received IR light to detect images. Cameras 810A and 810B face angle A such that, for example, hand gestures presented by a user of eyewear device 800 in front of the eyewear device 800 are detected. Cameras 810A and 810B capture high quality images of the remote object as the frame is formed of IR transmissive material.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
   an infrared (IR) camera;
   a display; and
   a frame supporting the IR camera and the display, the frame including an IR transparent surface portion covering the IR camera, wherein at least 50% of the frame is comprised of an IR transparent material.

2. The eyewear device of claim 1, wherein the frame is entirely comprised of the IR transparent material.

3. The eyewear device of claim 1, wherein the IR transparent surface portion comprises a resin.

4. The eyewear device of claim 1, wherein the IR transparent surface portion comprises an optical surface configured to permit IR transmission of IR light to the IR camera.

5. The eyewear device of claim 4, wherein the IR transparent surface portion has a uniform thickness.

6. The eyewear device of claim 4, wherein the IR camera faces the IR transparent surface portion at an angle that is less than 90 degrees.

7. The eyewear device of claim 4, wherein the frame has a frame face and wherein the optical surface is angled with respect to the frame face.

8. The eyewear device of claim 4, wherein IR light is configured to be directed through the optical surface at an angle.

9. The eyewear device of claim 4, further comprising a cavity disposed between the IR camera and the IR transparent surface portion.

10. The eyewear device of claim 1, further comprising an IR light source configured to emit IR light, wherein the IR camera is configured to detect reflections of the IR light.

11. The eyewear device of claim 4, wherein the frame comprises a rim configured to support the display and a bridge adjacent the rim and wherein the optical surface forms a portion of the rim.

12. The eyewear device of claim 1, further comprising an IR sensor disposed in the frame and configured to sense IR signals passing through the frame.

13. An eyewear device, comprising:
    an infrared (IR) camera;
    a display; and
    a frame supporting the IR camera and the display, the frame including a frame face and an IR transparent surface portion covering the IR camera and configured to permit IR transmission of IR light to the IR camera, wherein the IR transparent surface portion is angled with respect to the frame face, and the IR camera faces the IR transparent surface portion at an angle A that is less than 90 degrees, wherein at least 50% of the frame is comprised of an IR transparent material.

14. A method of using an eyewear device comprising an infrared (IR) camera, a display, and a frame supporting the IR camera and the display, the frame including an IR transparent surface portion covering the IR camera, wherein at least 50% of the frame is comprised of an IR transparent material, the method comprising the steps of:
    transmitting, by the IR transparent surface portion, IR light from a source;
    receiving, by the IR camera, the IR light transmitted through the IR transparent surface portion; and
    processing received IR light to detect images.

15. The method of claim 14, wherein the IR camera detects hand gestures.

16. The method of claim 14, wherein the eyewear device comprises an IR light source, further comprising:
    the IR light source generating IR light; and
    the IR camera sensing reflections of the IR light.

17. The eyewear device of claim 14, wherein the frame is entirely comprised of the IR transparent material.

18. The method of claim 14, wherein the IR transparent surface portion has a uniform thickness.

19. The method of claim 14, wherein the IR camera faces the IR transparent surface portion at an angle A that is less than 90 degrees.

20. The method of claim 14, wherein the frame has a frame face, wherein the IR transparent surface portion is angled with respect to the frame face.

\* \* \* \* \*